US005611461A

United States Patent [19]

Kubota et al.

[11] Patent Number: 5,611,461

[45] Date of Patent: Mar. 18, 1997

[54] INK CONTAINER

[75] Inventors: Hidemi Kubota, Komae; Torachika Osada, Yokohama, both of Japan

[73] Assignee: Canon Kabushiki Kaisha, Tokyo, Japan

[21] Appl. No.: 627,334

[22] Filed: Apr. 4, 1996

Related U.S. Application Data

[63] Continuation of Ser. No. 414,588, Apr. 3, 1995, abandoned, which is a continuation of Ser. No. 31,308, Mar. 15, 1993, abandoned.

[30] Foreign Application Priority Data

| | | | |
|---|---|---|---|
| Mar. 13, 1992 | [JP] | Japan | 4-054902 |
| Mar. 13, 1992 | [JP] | Japan | 4-054903 |
| Dec. 9, 1992 | [JP] | Japan | 4-329293 |

[51] Int. Cl.$^6$ ..... G01D 15/16

[52] U.S. Cl. ..... 222/105; 222/107; 347/86

[58] Field of Search ..... 222/92, 95, 105, 222/107; 347/86, 87; 383/107, 120

[56] References Cited

U.S. PATENT DOCUMENTS

| | | | |
|---|---|---|---|
| 584,555 | 6/1897 | Lorenz | 383/120 |
| 1,860,244 | 5/1932 | Grant | 383/107 X |
| 2,361,876 | 10/1944 | Schell | 222/107 X |
| 2,821,337 | 1/1958 | Morgan, Jr. | 383/107 X |
| 2,861,718 | 11/1958 | Winzen | 222/105 |
| 3,559,847 | 2/1971 | Goodrich | 222/107 |
| 3,595,441 | 9/1971 | Grosjean | 222/107 |
| 4,415,085 | 11/1983 | Clarke et al. | 222/107 X |
| 4,509,062 | 4/1985 | Low et al. | 346/140 R |
| 4,709,249 | 11/1987 | Hanagata | 346/140 R |
| 4,719,475 | 1/1988 | Kiyohara et al. | 346/140 R |
| 4,771,295 | 9/1988 | Baker et al. | 346/1.1 |
| 4,790,029 | 12/1988 | LaFleur et al. | 222/105 X |
| 4,885,762 | 8/1989 | Suzuki | 346/140 R |
| 4,928,126 | 5/1990 | Asai | 346/140 R |
| 5,025,271 | 6/1991 | Baker et al. | 346/140 R |
| 5,139,168 | 8/1992 | Gueret | 222/105 X |
| 5,226,564 | 7/1993 | Steer et al. | 222/107 |
| 5,248,063 | 9/1993 | Abbott | 222/105 X |
| 5,292,033 | 3/1994 | Gueret | 222/95 |
| 5,373,965 | 12/1994 | Halm et al. | 222/92 |

FOREIGN PATENT DOCUMENTS

| | | | |
|---|---|---|---|
| 560398A2 | 9/1993 | European Pat. Off. | 347/86 |
| 2709730 | 9/1978 | Germany | 347/86 |
| 59-098857 | 6/1984 | Japan . | |
| 61-141562 | 6/1986 | Japan . | |
| 63-087242 | 4/1988 | Japan . | |
| 63-097569 | 6/1988 | Japan . | |
| 63-101567 | 7/1988 | Japan . | |
| 1133749 | 5/1989 | Japan . | |
| 40524143 | 10/1993 | Japan | 347/86 |

*Primary Examiner*—Andres Kashnikow
*Assistant Examiner*—Kenneth Bomberg
*Attorney, Agent, or Firm*—Fitzpatrick, Cella, Harper & Scinto

[57] ABSTRACT

An ink container comprising a flexible bag is of a polygonal cross-section when it is filled with a sufficient quantity of ink.

9 Claims, 19 Drawing Sheets

INK CONTAINER

This application is a continuation of application Ser. No. 08/415,588 filed Apr. 3, 1995, now abandoned, which is a continuation of application Ser. No. 08/031,308, now abandoned, filed Mar. 15, 1993.

FIELD OF THE INVENTION AND RELATED ART

The present invention relates to an ink container for an ink jet recording apparatus.

An example of conventional ink containers for an ink jet recording apparatus for effecting recording on a recording material such as paper with ink, is in the form of a bladder or elastic material, as shown in Japanese Laid-Open Patent Application No. 98857/1984, for example. As shown in FIG. 1, which is a partial sectional view of the container adjacent the opening portion of the container, a side wall having a large thickness t1 is covered with a thin flexible member 200. With delivery of the ink, the side wall collapses elastically. Another example of the ink container is disclosed in Japanese Laid-Open Patent Application No. 87242/1988. As shown in FIG. 2 in an exploded perspective view, a porous absorbing material 202 is placed in the container 201, and the container 201 is closed by a cover 203. As a further example, as shown in FIG. 3 in a perspective view, an envelope type container 204 made of soft material is used. A leaf-shaped flange is sandwiched by the flexible material of the envelope, and the envelope is fuse-sealed at a part 207 of the outer edge. The flange is provided with a plug 206, from which the ink is delivered. Designated by reference numeral 208 is a rectangular parallelepiped outer casing. The above-mentioned elastic bladder type ink container has an elastic nature with the result that the elastic restoring force is produced in the direction of sucking the ink back into the elastic bladder, with consumption of the ink. The restoring force gradually increases. At a certain stage, the ink sucking pressure inside the ink becomes larger than the ink sucking-out pressure, and then it is no longer possible to deliver the ink. Therefore, not all of the ink in the bladder is used up, and therefore, the use efficiency is poor. The inventors experiments have revealed that the use efficiency is approx. 50% when the elastic bladder type ink container is used with an ink jet printer. As the case may be, the use efficiency is even smaller.

When a porous absorbing material 202 is used as a material of the ink container, cavities are produced in the porous material 202 with the consumption of the ink. At a certain stage of the ink delivery, a cavity is produced between the portion of the absorbing material adjacent the outlet and the portion of the absorbing material still containing the ink, and the cavity expands even to the extent that the ink can not be sucked out. Therefore, the ink use efficiency is 50% or lower, similarly to the case of the above-described bladder type container.

In order to solve the above problems, the envelope type container 204 of flexible material is used. In this case, the ink use efficiency is not less than 90%. However, because of the shape of the ink container, the quantity of ink which the container is capable of actually containing is relatively small. In the case where a thin rectangular parallelepiped case 208 is used for the container 204, as shown in FIG. 3, the accommodation efficiency for the ink relative to the given volume is not so low. However, if use is made with an envelope type container as an outer casing 14 having a configuration as shown in FIG. 9, the accommodatable volume is small. Recently the demand for the recording apparatus is directed to smallness of the size, and thus the space allotted to the ink container becomes very small. In such a case, a rectangular parallelopiped shape having a cross-section close to square is preferred to the thin and wide container. A cubic ink container is further preferable from the accommodation efficiency standpoint. In other words, the need exists in an ink container having small longitudinal, lateral and height dimensions while keeping a large as possible accommodation capacity.

SUMMARY OF THE INVENTION

Accordingly, it is a principal object of the present invention to provide an ink container having a high ink accommodating capacity and a high ink use efficiency.

According to an aspect of the present invention, there is provided an ink container comprising a flexible bag which is of a polygonal parallelopiped shape when it contains sufficient quantity of ink.

According to this aspect of the present invention, the ink container efficiently utilizing the small volume, and the ink container is capable of delivering the ink with a minimum of waste ink.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
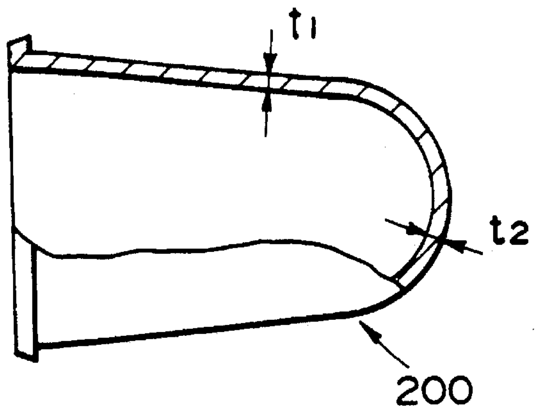
FIG. 1 PRIOR ART
FIG. 1 is a partly cross-sectional view of a first conventional example of an ink container.
Figure 2:
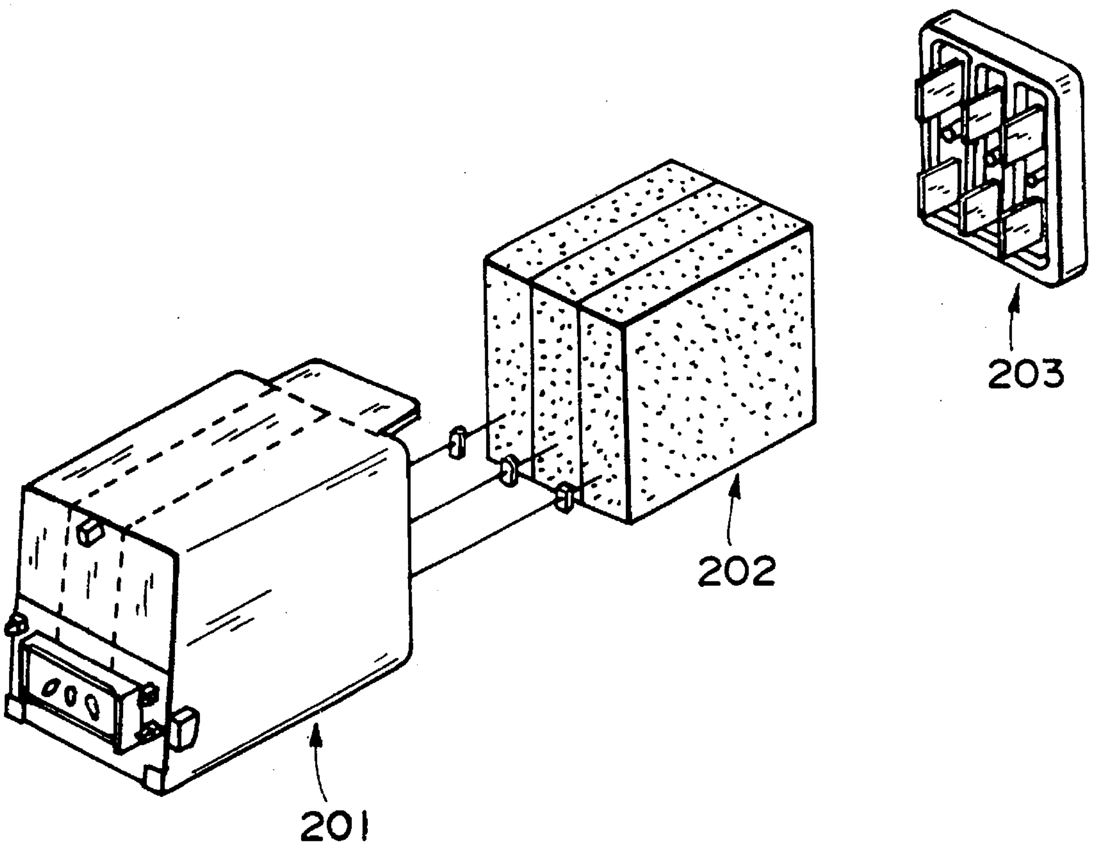
FIG. 2 PRIOR ART
FIG. 2 is a perspective view of a second conventional example of a container.
Figure 3:
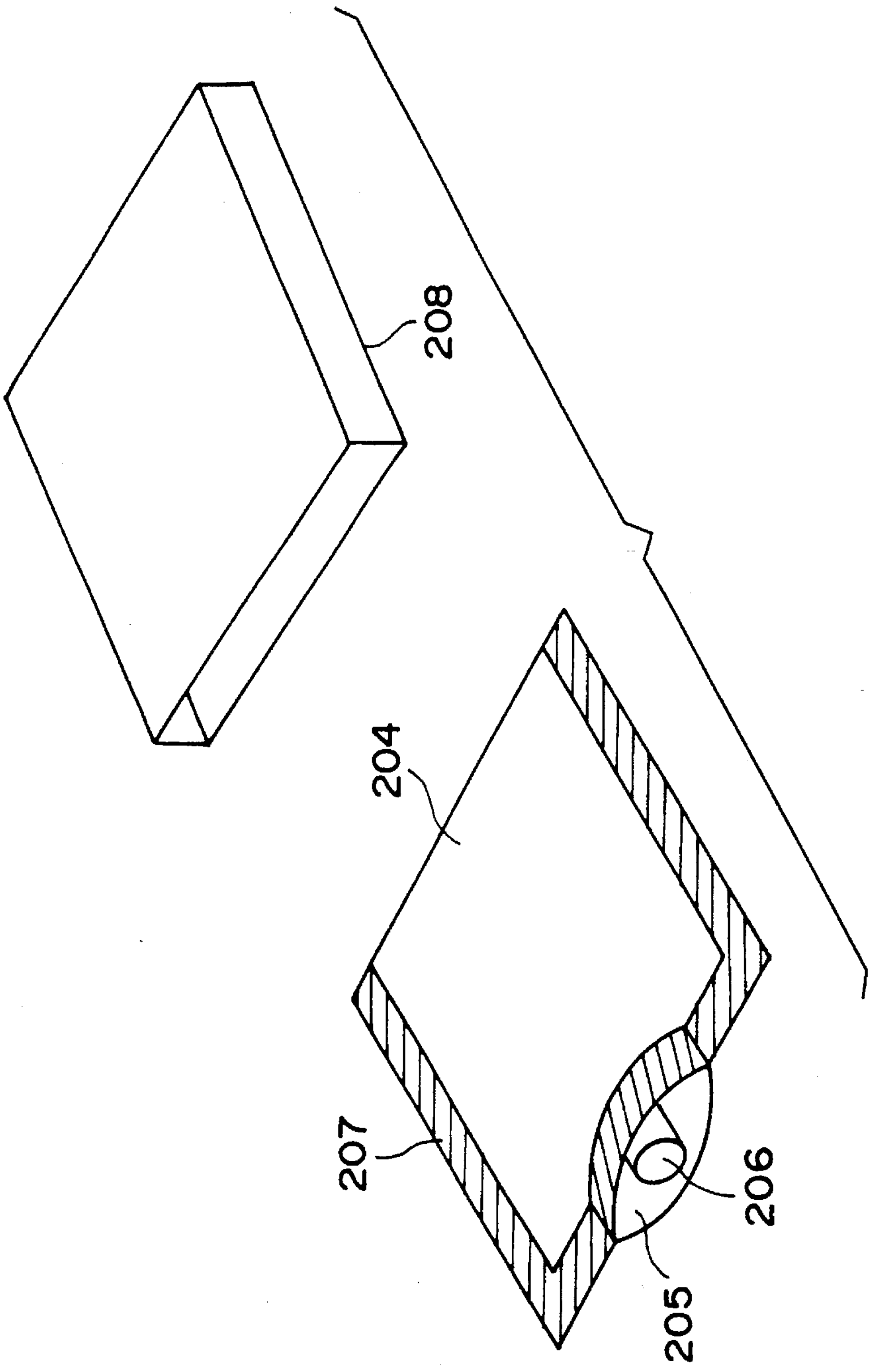
FIG. 3 PRIOR ART
FIG. 3 is a perspective view of a third conventional example of an ink container.
Figure 4:
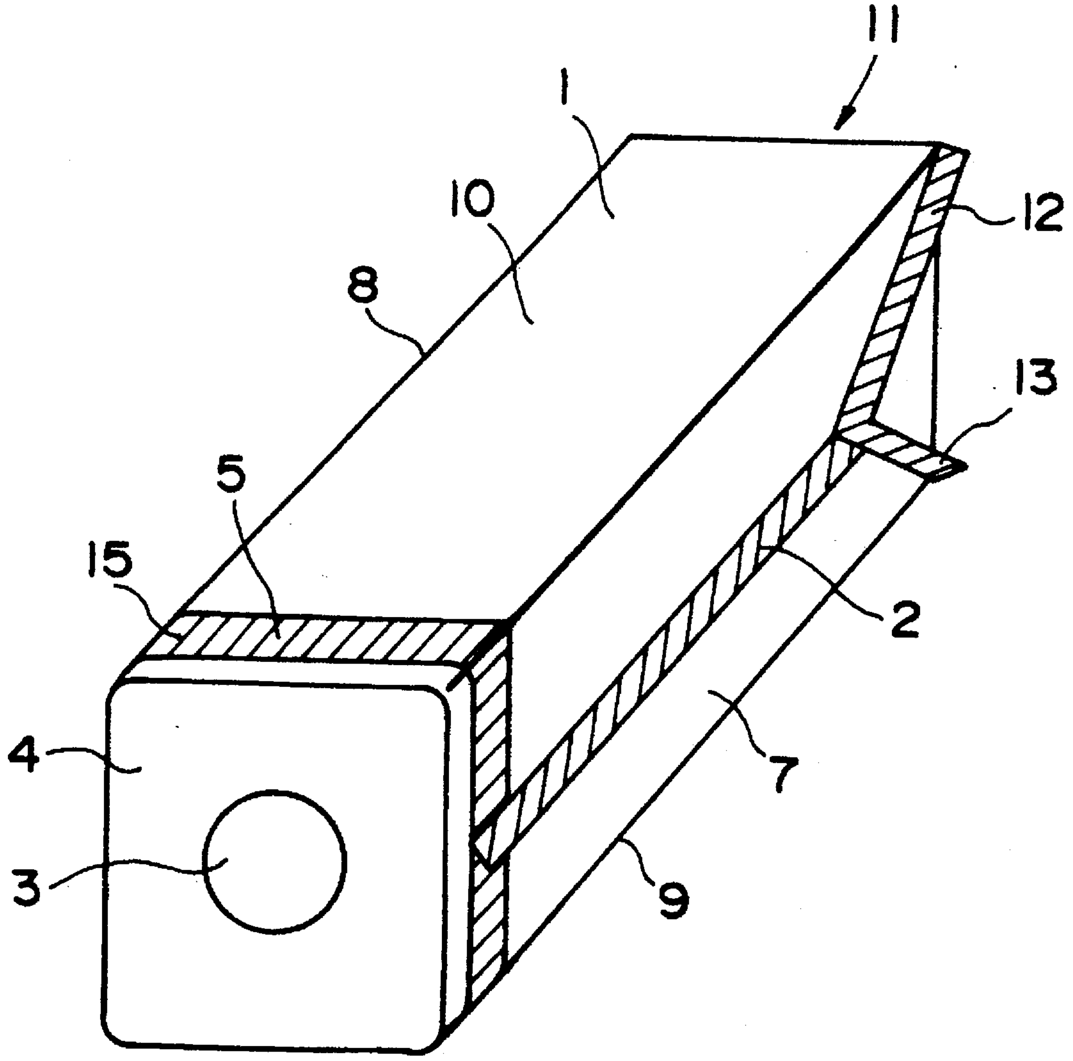
FIG. 4 is a perspective view of an ink container according to a first embodiment of the present invention, in which the container is shown as filled with ink.

Referring to FIG. 4, there is shown in a perspective view an ink container used with a recording apparatus (printer) in an information processing apparatus such as an electronic computer or the like, wherein the container is filled with ink. The container is in the form of a rectangular parallelopiped bag 1 made of flexible film material. The preferable materials for the film includes polyethylene, polypropylene resin materials or the like. Another high polymer resin material is usable. A multi-laminated structure is preferable to provide suitable functions. As examples, flexible polyethylene film or polypropylene film may be attached to a polyester film or polyamide film, or a polyethylene resin film or polypropylene resin film may be laminated. In these cases, the polyethylene or polypropylene resin materials are inside, that is, are in contact with the ink. The inside material preferably has lower fusing point. This is preferable also from the standpoint of the chemical characteristics of the bag 1. The polyethylene and polypropylene or the like materials having high chemical resistant properties, but have a relatively poor gas sealing nature. More particularly, there is a possibility that the water and other ink components are evaporated out, and the external air or gas enters the ink container, with the result of an intended result. On the other hand, the polyester and polyamide resin have slightly poorer chemical resistant property, however, they have very good gas sealing properties. Therefore, they are combined in the ink bag, so that the ink container which is easy to manufacture and which provides better performance, is accomplished. Designated by reference numerals 2, 12 and 13 are seams provided by manufacturing this bag 1. The seams are in the form of "Y" when the ink is contained in the bag 1. The Y-shaped seam is also formed symmetrically on the side surface 8 faced to the other side. On the other hand, there is no seam in the sides 9, 10 and the bottom side 11. The bag 1 is fused or bonded to a rectangular flange 15 integrally formed on a covering member 4 having an ink outlet opening. As another example, simple crimping will be enough using a rubber ring or the like. For the purpose of better understanding, the ink container is shown as a separate member from a printing head in this Figure. However, the ink container may be integral with the printing head with the communication therebetween through the outlet 3. The bag shown in this Figure is of a rectangular parallelopiped shape when it contains a sufficient quantity of the ink.

Figure 5:
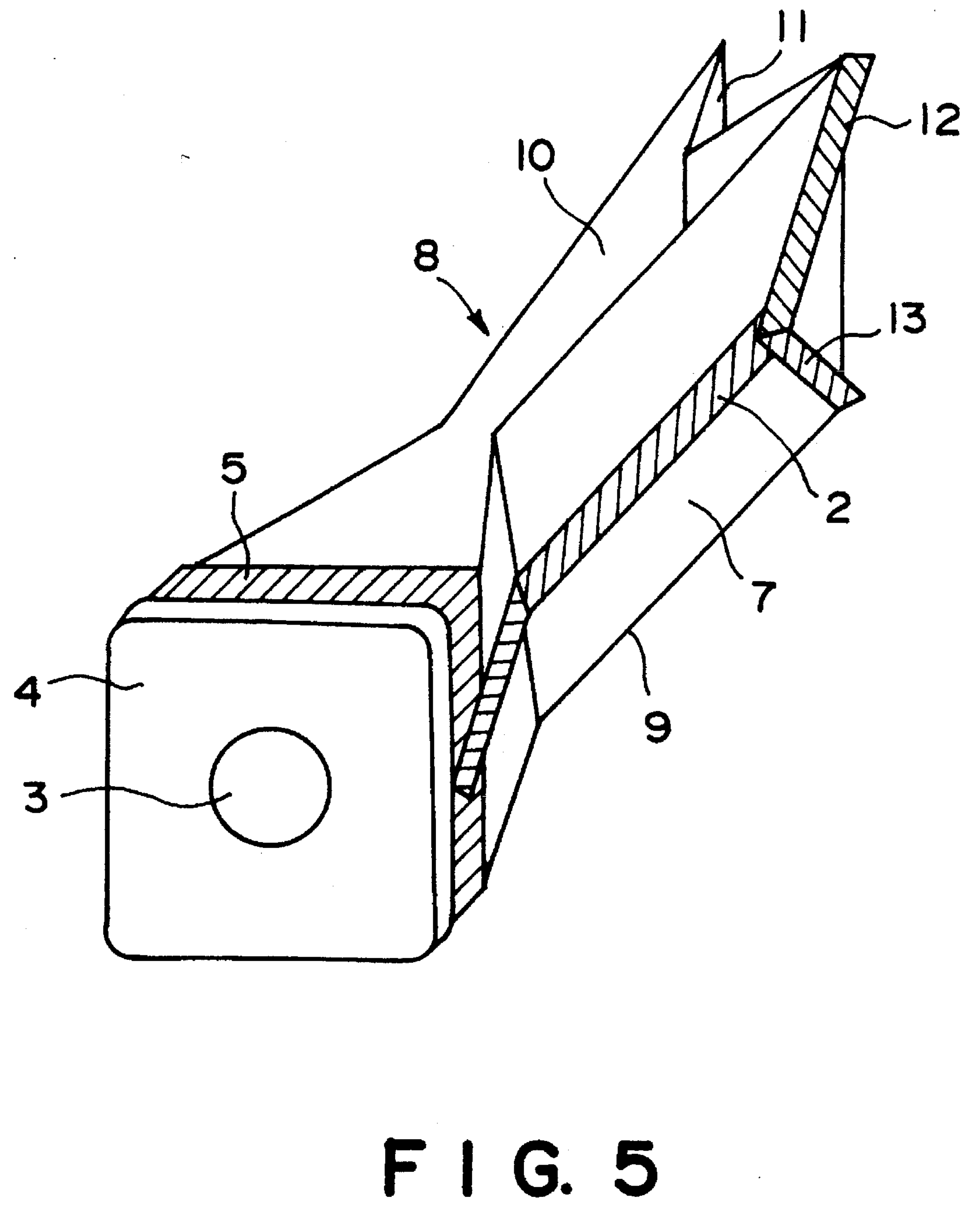
FIG. 5 is a perspective view of the ink container of FIG. 4 after the ink is used.

FIG. 5 is a perspective view illustrating how the bag collapses when the ink is delivered. The design of the system is such that the ink in the bag 1 is non-usable when the inside pressure becomes −180 mmAq. As will be understood from this Figure, the sides 9, 10 and 11 of the bag 1 move toward the inside, with the sides 9, 10 and 11 not having seams 2, 12 or 13. When the inside pressure of the bag 1 reduces with the consumption of the ink, the sides 7, 8, 9 and 10 of the bag 1 receive the same vacuum. However, the seams provide the function of reinforcing the sides 7 and 8 like a reinforcing ribs, and therefore, such sides less easily collapse toward the inside. Therefore, in most cases, the bag 1 collapses in order as shown in FIG. 5, that is the sides 9, 10 and 11 collapse toward the inside. Particularly in the shown example, the connecting seams are provided in the sides 9, 10 and 11 in this embodiment because of the conveniences in the manufacturing, such sides collapse in good order. Thus, the bag 1 is folded regularly without crease or the like, thus permitting sufficient use of the ink inside the bag.

Figure 6:
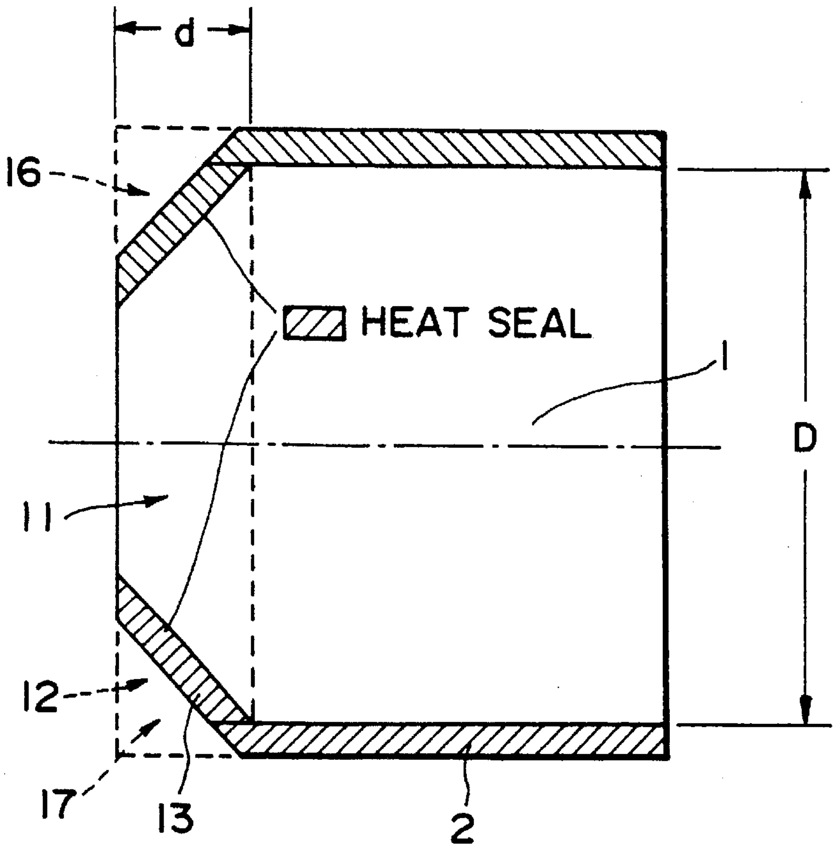
FIG. 6 is a sectional view showing an outer shape of an envelope.
Figure 7:
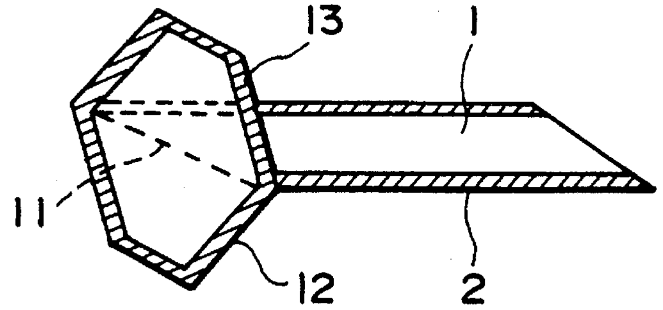
FIG. 7 is a perspective view of the envelope of FIG. 6 in which the bottom portion is expanded.

With the structure of the bag 1, there is no need for an additional member for preventing unintended folding or bending, as shown in Japanese Laid-Open Utility Model Application No. 97569/1988 or Japanese Laid-Open Utility Model Application No. 101567/1988. Therefore, the manufacturing of such an ink bag is very simple. FIG. 6 and 7 show the bag immediately after being manufactured. In FIG. 6, the bottom side 11 is folded inside. FIG. 7 is a perspective view in which the bottom side is expanded. The hatched seam portions 2, 12 and 13 are sealed by heat fusing. When the heat sealing is carried out, it is preferable that a two or more multi-layer laminated structure film is used in which the inside layer is made of a resin material having a lower fusing point than the outside layer, since then the bag 1 can be easily manufactured. More particularly, in FIG. 6 the bottom side portion 11 of the film blank is folded to the inside, and the hatched portions and the cut portions 16 and 17 which will be cut afterward, are heated by a heater. If the fusing temperature of the inside resin is lower than that of the outside resin, and the heater temperature is set to a level therebetween, the low fusing point resin faced to each other among the four layers in the heat sealing portions 12 and 13, are fused with the other two layers not fusing. Therefore, the structure is very convenient. When the ink is supplied to such a bag 1, it becomes a rectangular parallelopiped shape as shown in FIG. 4. It is not inevitable to cut the cutting portions 16 and 17.

Figure 8:
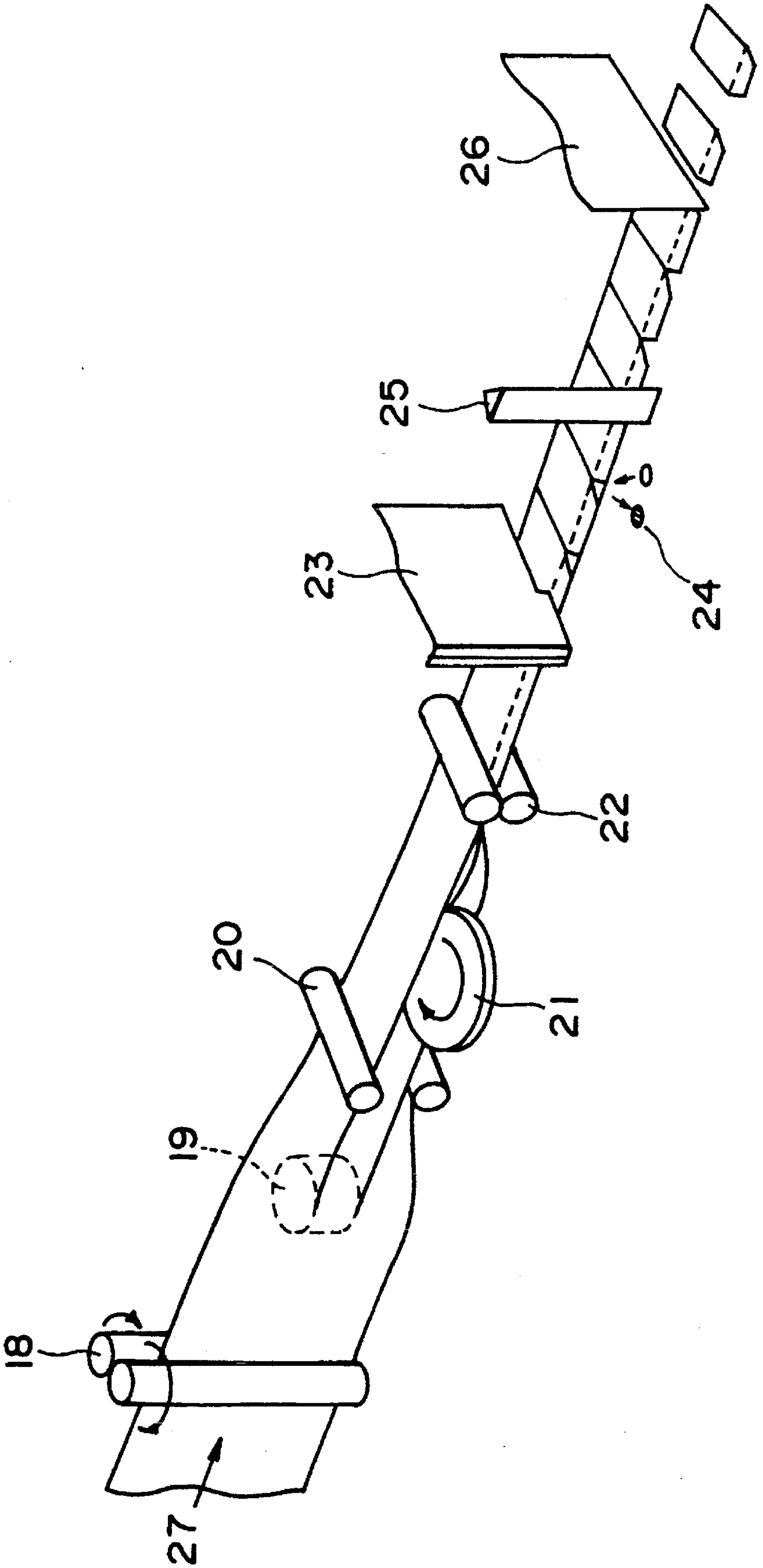
FIG. 8 is a perspective view of an automatic envelope manufacturing device for the envelope of FIG. 1.

FIG. 8 shows an example of a manufacturing apparatus with which the above process can be carried out automatically. A film 27 flowing from a roll 18 is controlled with determined dimension of the portion to be folded by a thickness adjusting roll 19 and a direction controlling roll 20. Then, the portion is formed into a folded portion by a folding roll 21 and a pressing roll 22. Then, the heat sealing device 23 is used. At this time, make the folding line sharper between the roll 22 and the device 23, the material is heated by a flat heater to a non-fusing degree, by which the dimensional accuracy is improved. In order to provide correct rectangular parallelopiped shape, the angle formed between the heat sealing portion 13 and the heat sealing portion 2 is selected to be 45 degrees. Since the folding amount is one half a length of one side of a rectangular shape constituting the bottom side, the folding amount d in FIG. 6 is preferably determined in the following manner.

$$D>2\times d \quad (1)$$

When d is D/4, the cross-section of the parallelopiped shape is square.

Designed by reference numeral 24 is a position detector which detects the heat sealing portion, and an output thereof is used to determine the operational timing of a cutter 25 for providing the cutting portions 16 and 17. The position detector 24 is used for the purpose of dimensional accuracy, and therefore, is not inevitable. On the contrary, a greater number of the position detectors may be used, and the cutters 25 and 26 are controlled with a computer. This may be properly selected by one skilled in the art depending on the physical properties of the film 27 and the required dimensional accuracy of the bag.

Figure 9:
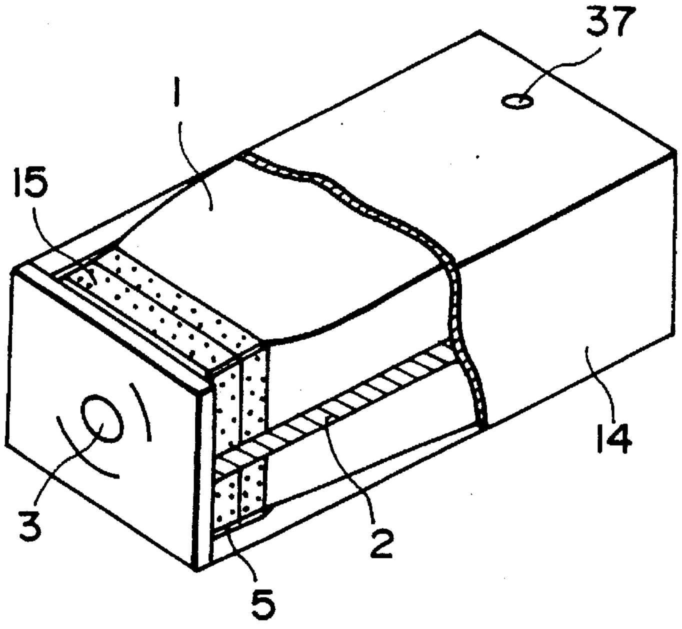
FIG. 9 is a perspective view in which the ink container of FIG. 4 is contained in an outer cylindrical casing.

FIG. 9 is a perspective view in which the ink container 1 is set in an outer casing 14. The outer cylindrical casing 14 and a rectangular covering member 15 with flange may be manufactured by molding resin material. The usable materials include various resin materials such as polyethylene, polypropylene, polycarbonate or polysulfone resin material. However, in consideration of the molding accuracy, fusing, cost or the like, the preferable material in this embodiment is polypropylene resin. For example, the bag 1 wall comprises a polyester film having a thickness of 9–12 microns and a polypropylene resin layer having a thickness of 20–30 microns, laminated thereon (two layer structure). This provided satisfactory results. In this case, when a more flexible film is desired, a film laminated with polyethylene resin is preferable. When a stronger fusing is desired with respect to the covering member 15, a film laminated with the polypropylene resin is preferable. The connection between the bag 1 and the flange may be effected with bonding material or with the resiliency of rubber or the like. The heat fusing is a simple method. It is also possible to use ultrasonic wave fusing. The connection between the outer casing 14 and the covering member 15 may be effected conveniently with heat fusing, ultrasonic wave fusing or mechanical connection. The outer casing is provided with an air vent 37 to ease the vacuum produced with the consumption of the ink. As the case may be, a pressure adjusting valve may be used.

Figure 10:
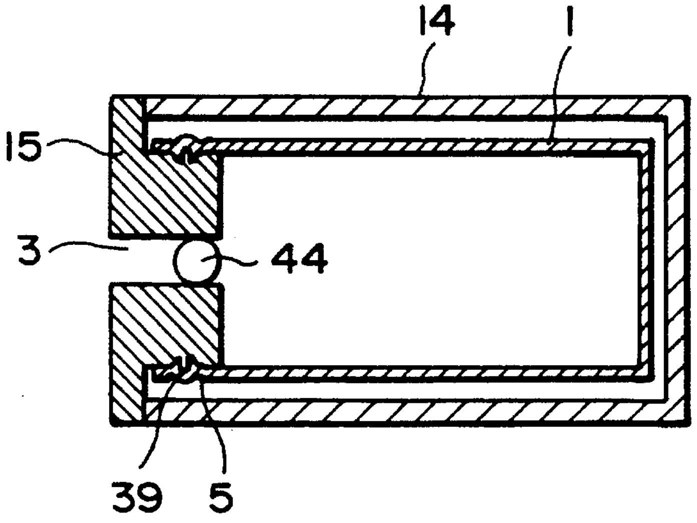
FIG. 10 is a sectional view of an ink container according to the first embodiment of the present invention.

The ink container of this embodiment, as shown in FIG. 10, is made of soft flexible film material in which it is fused in opposite sides at seams 2 into a bag. The bag is heat-fused to a rectangular flange 15 adjacent its top opening (reference numeral 5 designates the heat fusing portion). The flexible bag 1 of rectangular parallelopiped shape is accommodated in an outer casing 14 also having a rectangular parallelopiped shape. The rectangular flange 15 is provided with a discharge outlet 3 for delivering the ink, and the discharge outlet 3 is closed by a ball plug 44 (closing means) when it is not used for the recording. It contains the ink inside. The outer casing 14 is provided with an air vent 37. By this structure, the ink accommodation efficiency is good relative to the ink container volume.

Figure 11A:
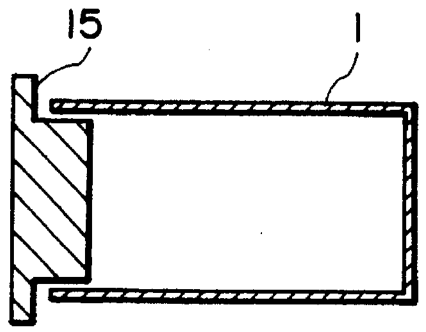
FIGS. 11A and 11B show a state before fusing, in an example.
Figure 11B:
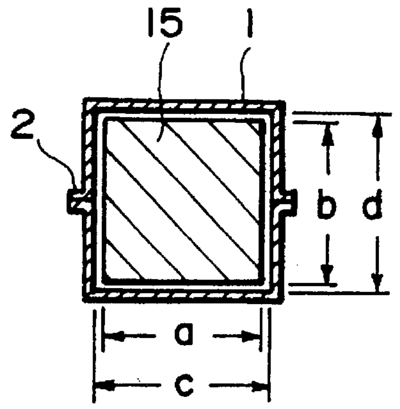
Figure 12A:
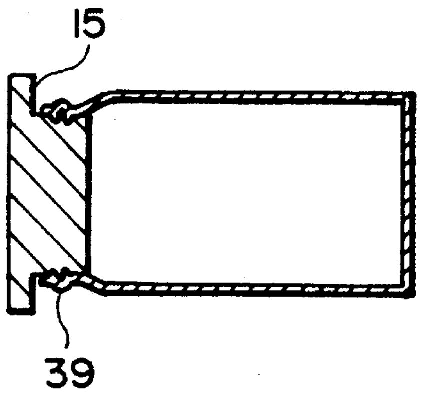
FIGS. 12A and 12B show a state after the fusing, in an example.
Figure 12B:
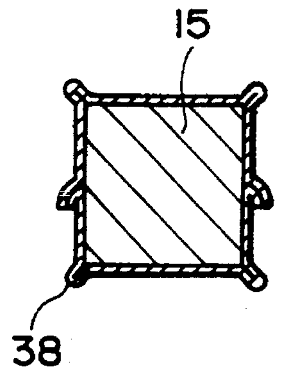

The fuse bonding method usable with this embodiment will be described. FIGS. 11A, 11B, 12A and 12B, show longitudinal and cross-sectional views before and after the fusing. A ratio between a peripheral length 2 (a+b) and a peripheral length 2 (c+d) of the rectangular flange 15 before the fusing shown in FIG. 11B, is 54:62, for example. By heat-fusing the flange 15 and the bag 1 having such a relation, as shown in FIG. 12B, heat fusing without leakage between the bag 1 and the flange 15, has been accomplished. The heat fusing shown in FIGS. 12A and 12B have the following features. First, the connecting portion between the flange 15 and the bag 1 is in the form of a rib, as indicated by a reference numeral 39. Second, the excessive portion of the peripheral length of the bag 1 relative to the peripheral length of the flange 1, is concentrated at corners 38 of the rectangular or square shape. Because of these features, the reliability of the heat fusing is improved.

Figure 13A:
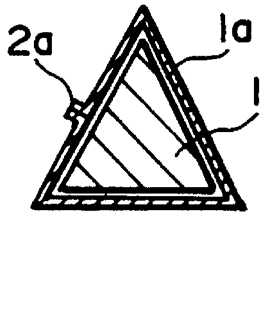
FIGS. 13A and 13B show states before and after the fusing, in another example.
Figure 13B:
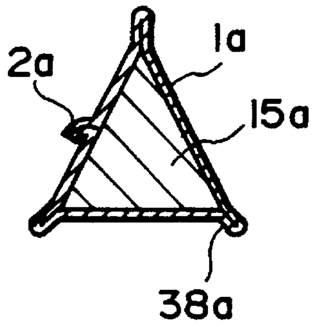
Figure 14B:
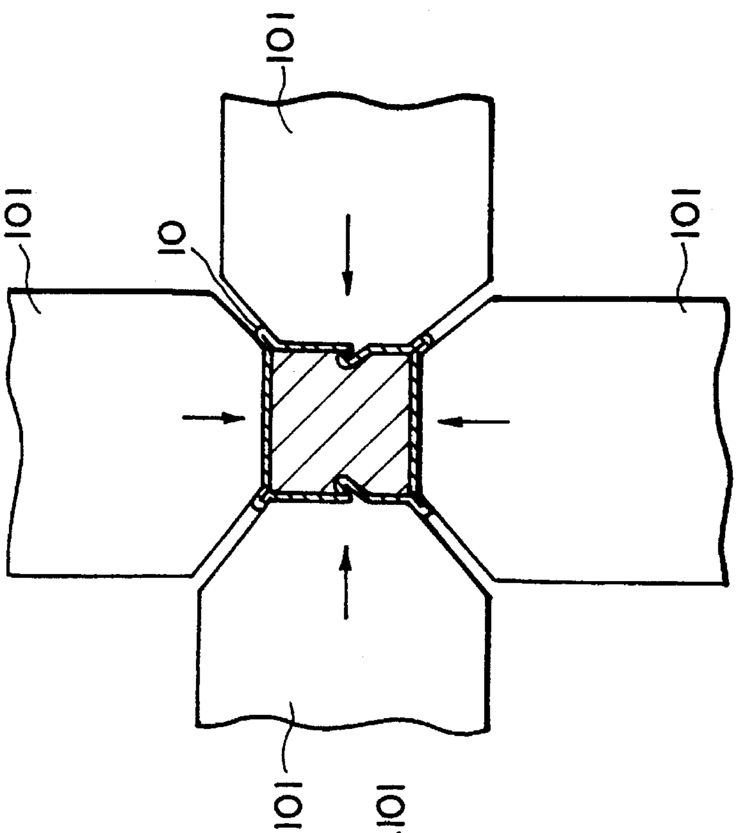
FIGS. 14A and 14B illustrate a fusing machine.
Figure 14A:
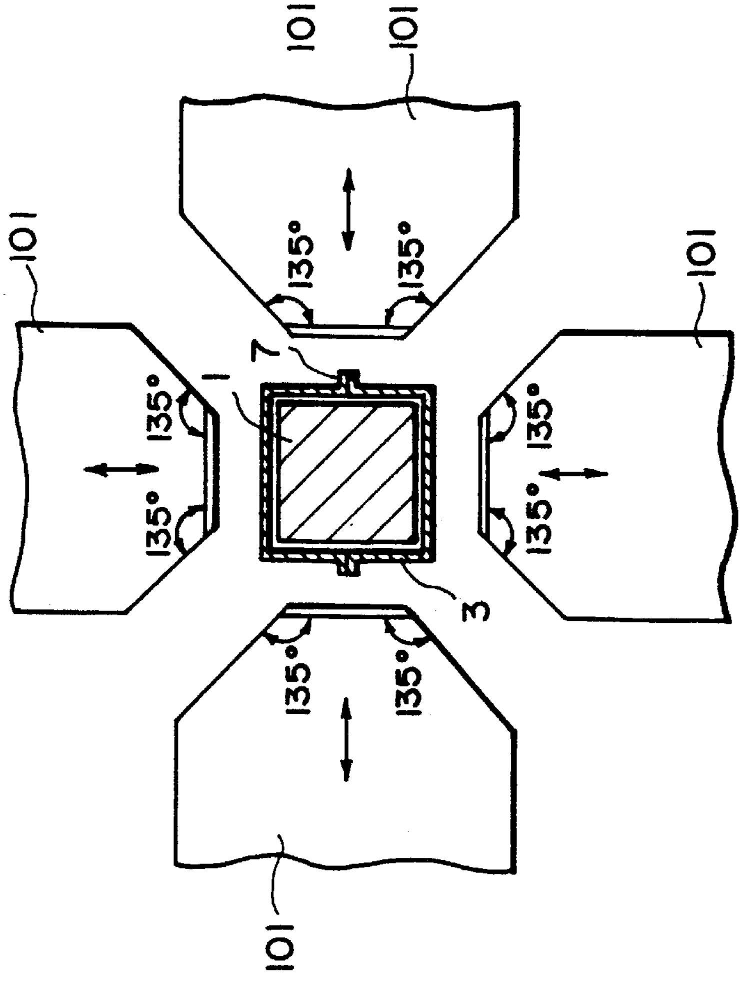

FIGS. 13A and 13B are a cross-sectional views before and after the heat fusing of a triangular flange portion 15*a*. As shown in this Figure, the excessive portion of the peripheral length of the bag 1 is concentrated at the corners 38*a* of the triangular shape, and the connecting portion between the flange 15*a* and the bag 1*a* is formed into a rib after the heat fusing, by which the leakage can be effectively prevented between the flange 15*a* and the bag 1*a*.

In the foregoing two embodiments, the rest portion of the bag is concentrated at corners of the flange, and are fused thereon. The shape of the flange is not limited to those described above.

Figure 15B:
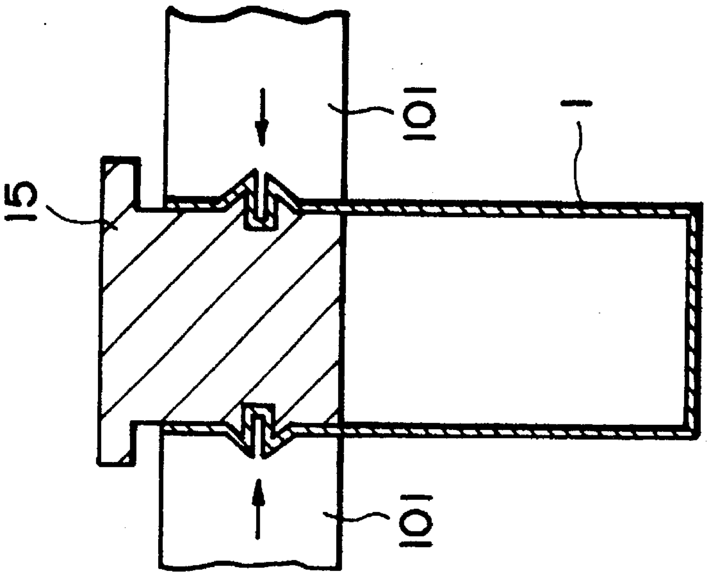
FIGS. 15A and 15B illustrate a fusing machine.
Figure 15A:
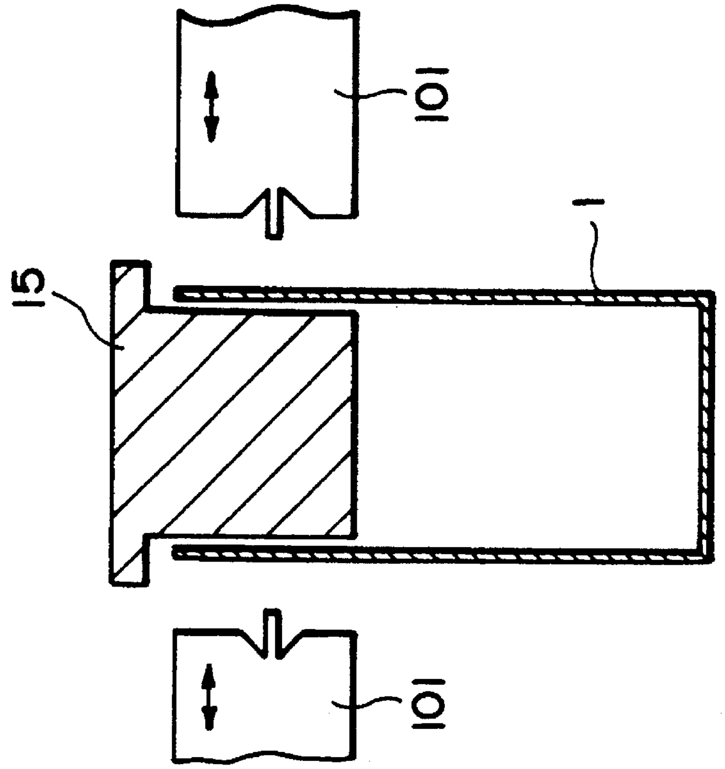

FIGS. 14A, 14B, 15A and 15B show a relation between a flange 15 and a configuration of an edge of a heat fusing heater blade 101 of a heat fusing device usable with the present invention. As shown in the figure, heaters 101" each having a length shorter than that of the flange 15, are simultaneously contacted to effect the heat fusing, so that the rest portions are heat fused, while the material of the flange 15 is melted and projected outwardly, so that the leakage of the ink at the corners can be effectively prevented. FIGS. 15A and 15B show a relationship between a side of the flange 15 and the heater 101. By providing a recess and a projection at an end of the heater 101, the material of the melted flange is confined.

As described in the foregoing, according to the embodiments of the present invention, a flexible bag is heat-fused on a polygonal flange having a circumferential length smaller than that of the flange. The excessive portion of the bag relative to the peripheral of the flange is concentrated at the corners of the polygonal shape, so that the ink leakage between the flange and the bag can be reliably prevented. When the bag has a heat-fusing portion, the connecting portion between the bag and the flange is formed into a rib after the fusing, by which the leakage is effectively prevented between the heat fusing portion of the bag itself and the heat fusing portion relative to the flange. By doing so, a polygonal shape flange and bag can be suitably combined, so that the ink accommodating efficiency relative to the volume of the ink container has been improved.

Figure 16:
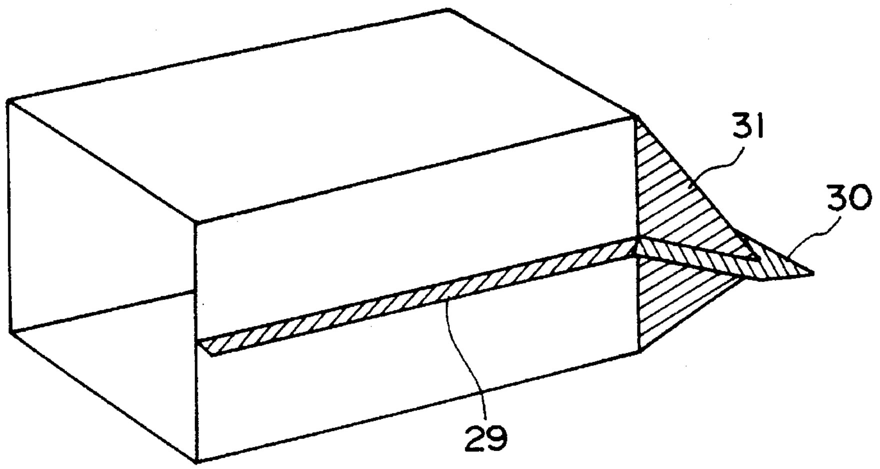
FIG. 16 is a perspective view of a square bag according to a second embodiment of the present invention.
Figure 17:
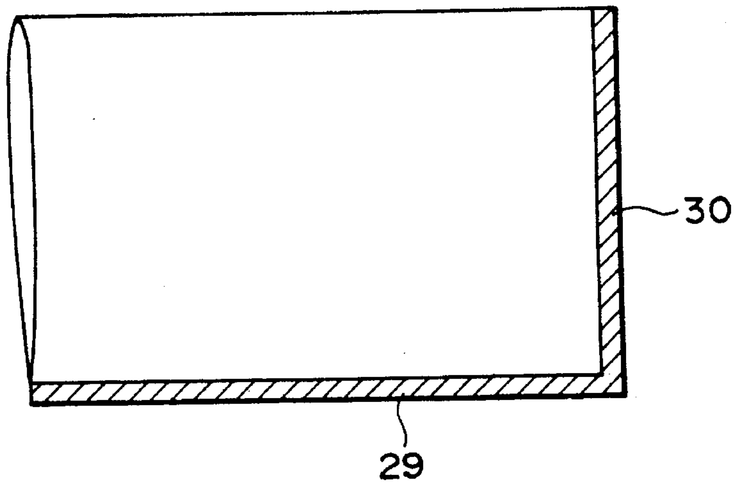
FIG. 17 is a perspective view of an original form of the bag of FIG. 16.
Figure 18:
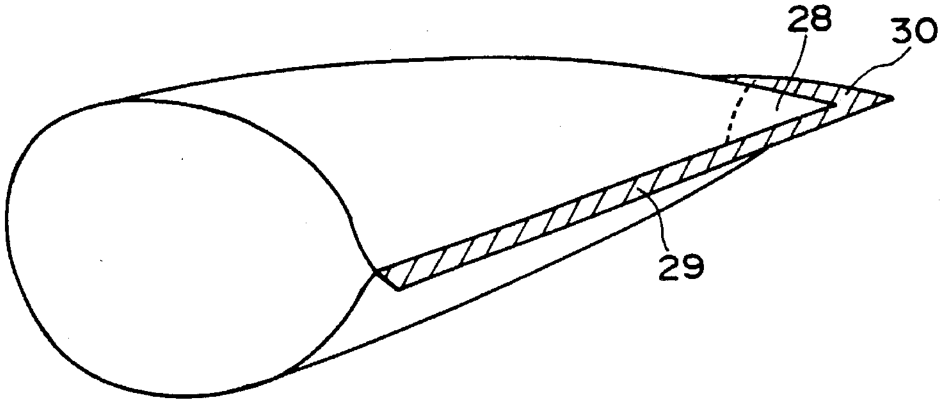
FIG. 18 is a perspective view of the envelope of FIG. 17, in which it is expanded.

FIG. 16 shows another example of a polygonal shape bag. A triangular heat sealing portion 31 is used in addition to the heat sealing portion 29 where the bag materials are connected and a seal 30 is in a bottom side. In this example, the bag is formed into a rectangular parallelopiped shape when the ink is supplied thereinto. In order to manufacture the bag, an envelope is first manufactured as shown in FIG. 17 (perspective view). Then, the bag is expanded to form a three dimensional shape similar to a tooth paste tube, as shown in FIG. 18 in a perspective view. Then, the bottom angular portion 28 (hatched portion) is formed into a triangular shape to provide a surface parallel to the bottom surface of the intended rectangular parallelopiped shape. This portion is heat sealed, by which a tongue 31 is formed. In this manner, the bag shown in FIG. 16 is produced.

Figure 19:
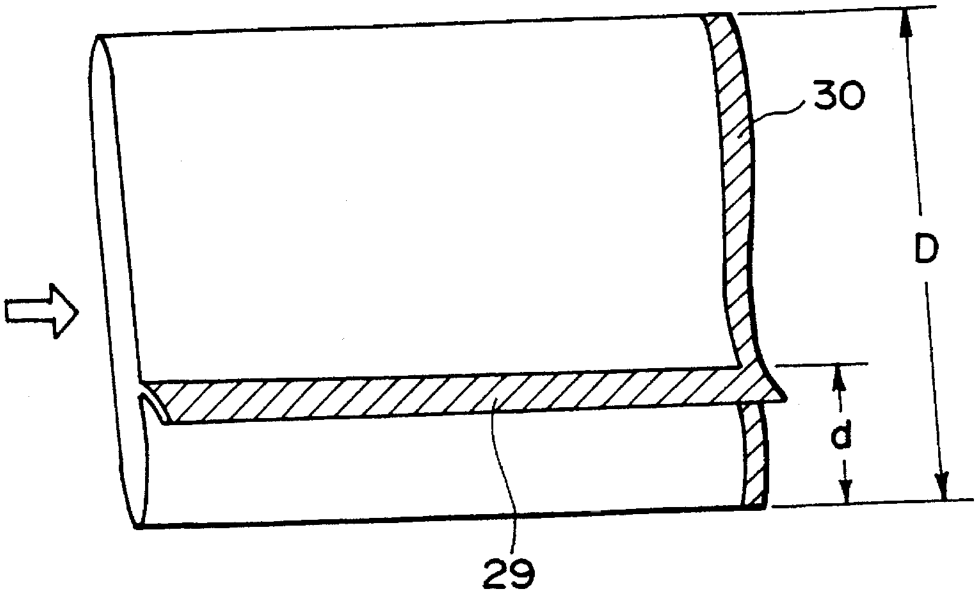
FIG. 19 is a perspective view of a bag according to a third embodiment of the present invention.

FIG. 19 is a perspective view of a bag according to a further embodiment. Similarly to the embodiment of FIG.

Figure 20:
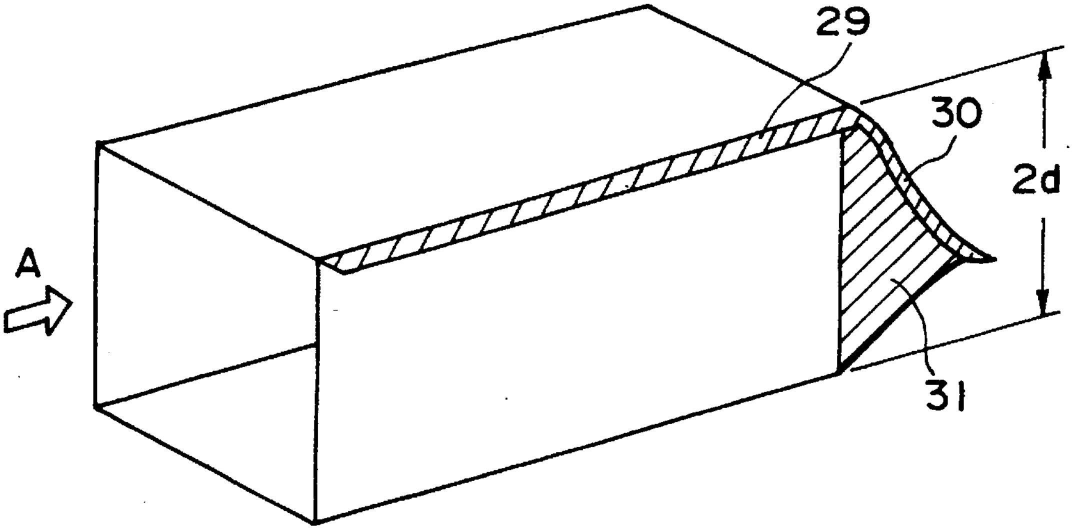
FIG. 20 is a perspective view in which the envelope of FIG. 19 is expanded.
Figure 21A:
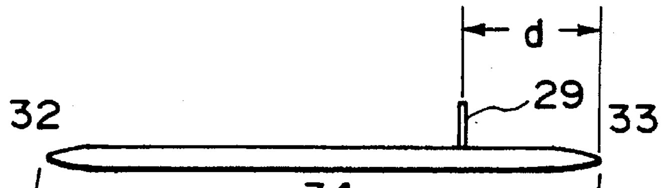
FIGS. 21A and 21B are views as seen in a direction A in FIG. 20.
Figure 21B:
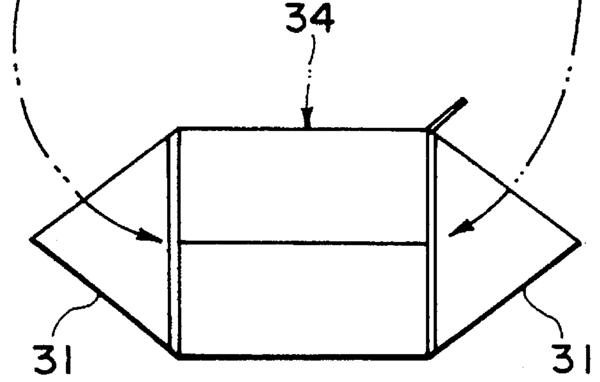
Figure 22A:
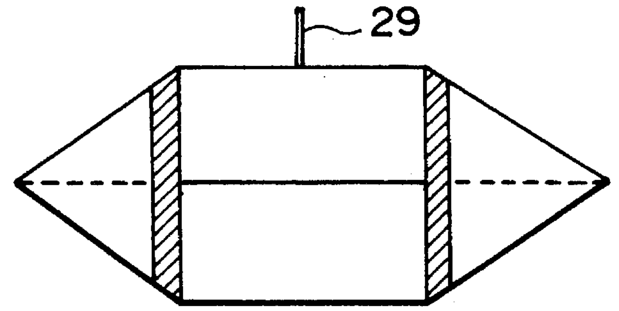
FIGS. 22A and 22B show an example of a heat seal.
Figure 22B:
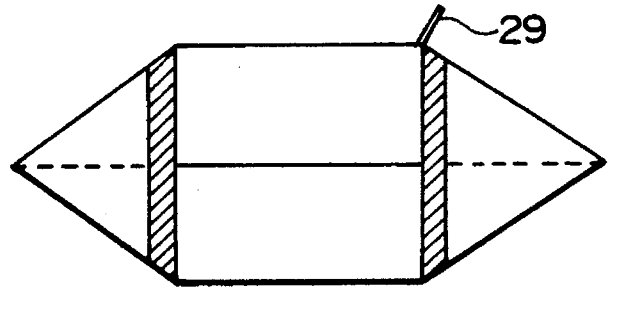

16, a polygonal bag is formed from an envelope shape. In this embodiment, however, unlike the situation shown in FIG. 17, the seam 29 is formed slightly inside rather than at the end. When the modified envelope shape is expanded, and thereafter, the tongue is formed, the resultant bag is as shown in FIG. 20. The feature of this bag is that the seam 29 of the bag itself is at the edge of the resultant bag. By doing so, the seam may be aligned with the corner of the flange when the bag is heat-fused on the flange. When they are not aligned, the bag seam is at the flat portion of the flange with the possible result that the melted resin does not sufficiently seep thereinto, and therefore, the ink leakage is possible here. The corner alignment structure removes this possibility, because the melted resin material sufficient seeps at the corners of the flange. FIG. 21A is a view as seen in a direction A in FIG. 20, showing positional relations of the seam 29, edges 32 and 33, the center line 34 and the tongue 31, between the envelope stage and the finished polygonal bag. In this Figure, the tongue 31 is constituted by points, and the region thereof is indicated. This portion is preferably heat-sealed at the entire surface. However, as shown in FIGS. 22A and 22B, a simplified heat sealing is possible in which only the root portion indicated by the hatching may be sealed. Most of the tongue portion 31 is not usable, and therefore, it may be removed by cutting if the increase of the manufacturing step by the cutting is not a problem. Particularly in that case, there is no need for heat-sealing the entire surface of the triangular portion. In FIG. 21A, a distance d between the seam to the adjacent end is determined in accordance with the inequation (1) as in the foregoing embodiment.

Figure 23:
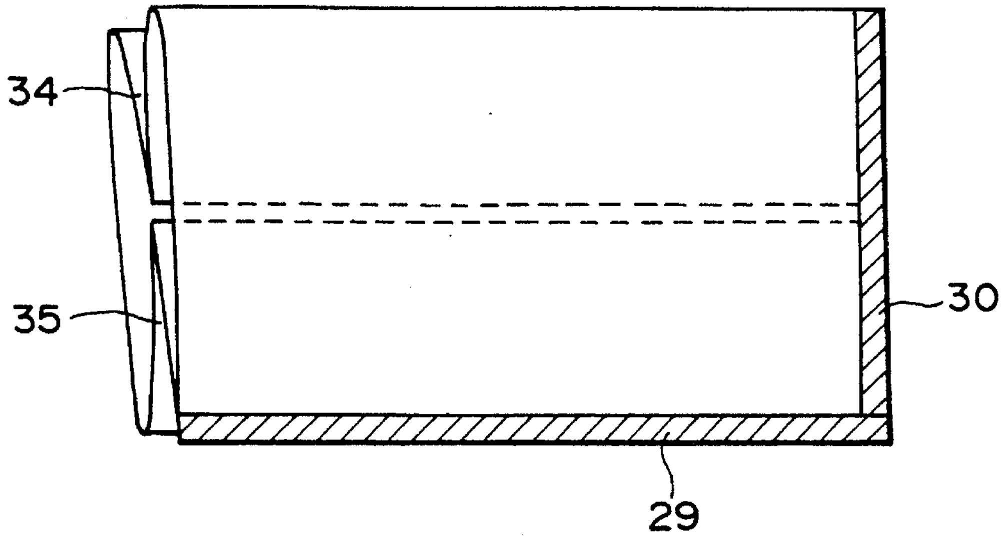
FIG. 23 is a perspective view of a bag according to a fourth embodiment of the present invention.
Figure 24:
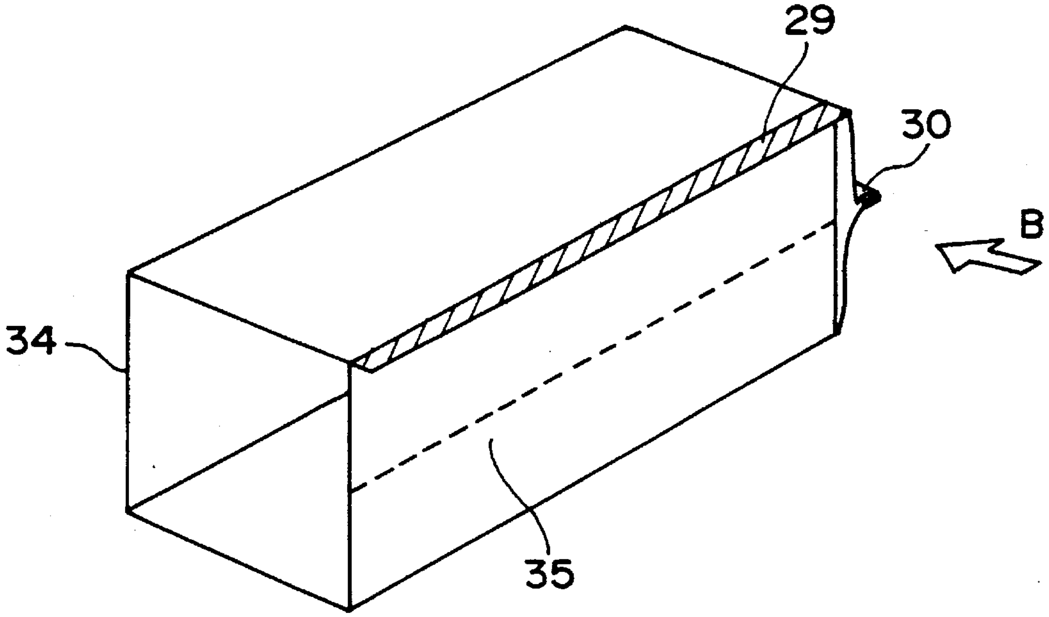
FIG. 24 is a perspective view of the bag of FIG. 23 in which it is expanded.
Figure 25:
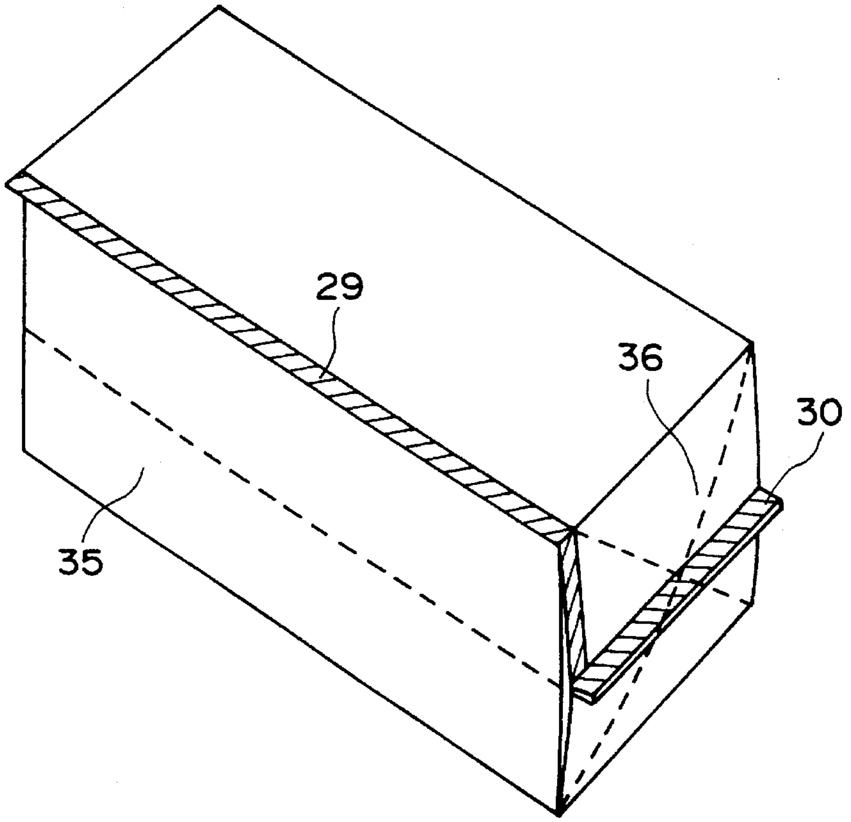
FIG. 25 is a perspective view as seen in a direction B in FIG. 24.

FIG. 23 shows a perspective view of a polygonal bag according to a further embodiment of the present invention. In this embodiment, the bag seal 29 is formed after formation of the folded portions 34 and 35 at the opposite ends. Thereafter, the bottom folded portion 31 is formed. When the bag is expanded, a rectangular parallelopiped bag shown in FIG. 24 can be manufactured. The folded portions 34 and 35 constitute side surfaces of the rectangular parallelopiped shape. When the bag is seen in a direction B in the Figure, the view is as shown in FIG. 25. In this Figure, a broken line 36 indicates formation of a triangular recess. As contrasted to the outward formation of the triangular tongue as in the embodiments of FIGS. 16 and 20, a triangular recess is formed in this embodiment. Therefore, in this embodiment, the excessive part of the film is folded into the inside of the rectangular parallelopiped shape, and therefore, there is no need for cutting. Also in this embodiment, the bag seam 29 can be determined at a desired position.

Figure 26:
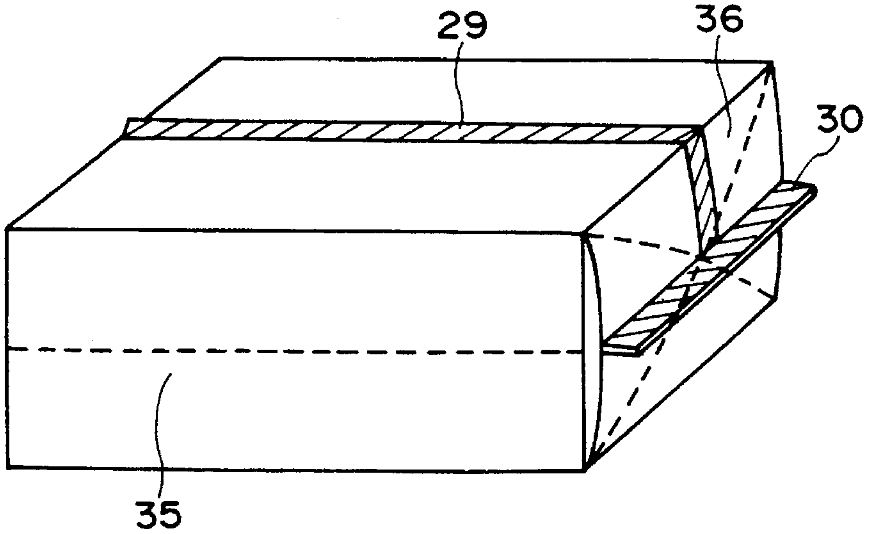
FIG. 26 is a perspective view of a bag according to a fifth embodiment of the present invention.

FIG. 26 shows an example in which the seam of the bag 29 is formed in the middle of a side surface thereof.

In the foregoing, various embodiments of the bag have been described. In all of these embodiments, a polyethylene laminated film and polypropylene covering member are used. As other examples, laminated film of polypropylene and a covering member of polycarbonate and polysulfone may be used. They may be selected in consideration of the mechanical strength of the elements and the flexibility of the bag.

RECORDING DEVICE

Figure 27:
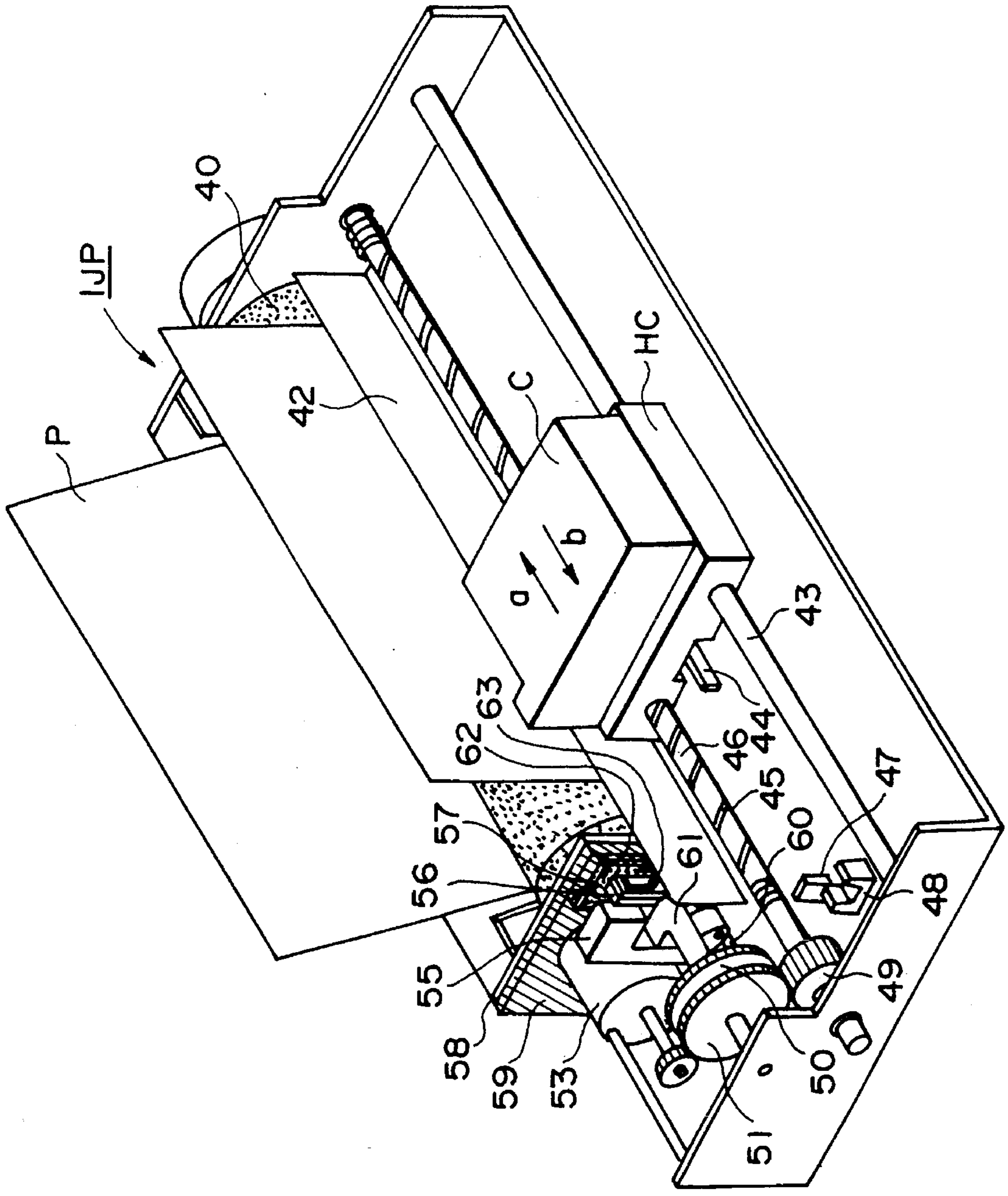
FIG. 27 is a perspective view of an example of a printer.

FIG. 27 is a perspective view of an ink jet recording apparatus IJRA in which the present invention is used. A lead screw 46 rotates by way of drive transmission gears 51 and 49 by the forward and backward rotation of a driving motor 53. The lead screw 46 has a helical groove 45 with which a pin (not shown) of the carriage C is engaged, by which the carriage C is reciprocable in directions a and b. A sheet confining plate 42 confines the sheet on the platen over the carriage movement range.

Home position detecting means 47 and 48 are in the form of a photocoupler to detect presence of a lever 44 of the carriage, in response to which the rotational direction of the motor 5 is switched. A supporting member 56 supports the front side surface of the recording head to a capping member 62 for capping the recording head. Sucking means 55 functions to suck the recording head through the opening 63 of the cap so as to recover the recording head.

A cleaning blade 57 is moved toward the front and rear by a moving member 57. They are supported on the supporting frame 58 of the main assembly of the apparatus. The blade may be in another form, more particularly, a known cleaning blade. A lever 61 is effective to start the sucking recovery operation and is moved with the movement of a cam 60 engaging the carriage, and the driving force from the driving motor is controlled by known transmitting means such as a clutch or the like.

The capping, cleaning and sucking operations can be performed when the carriage is at the home position by the lead screw 44 in this embodiment. However, the present invention is usable in another type of system wherein such operations are effected at different timing. The recording apparatus is provided with electric signal supply means to supply electric signals to the recording head, to effect the recording operation. The individual structures are advantageous, and in addition, the combination thereof is further preferable.

INFORMATION PROCESSING APPARATUS

The description will be made as to an example of an information processing apparatus (computer) using the present invention, and an electric circuit therefor.

Figure 28:
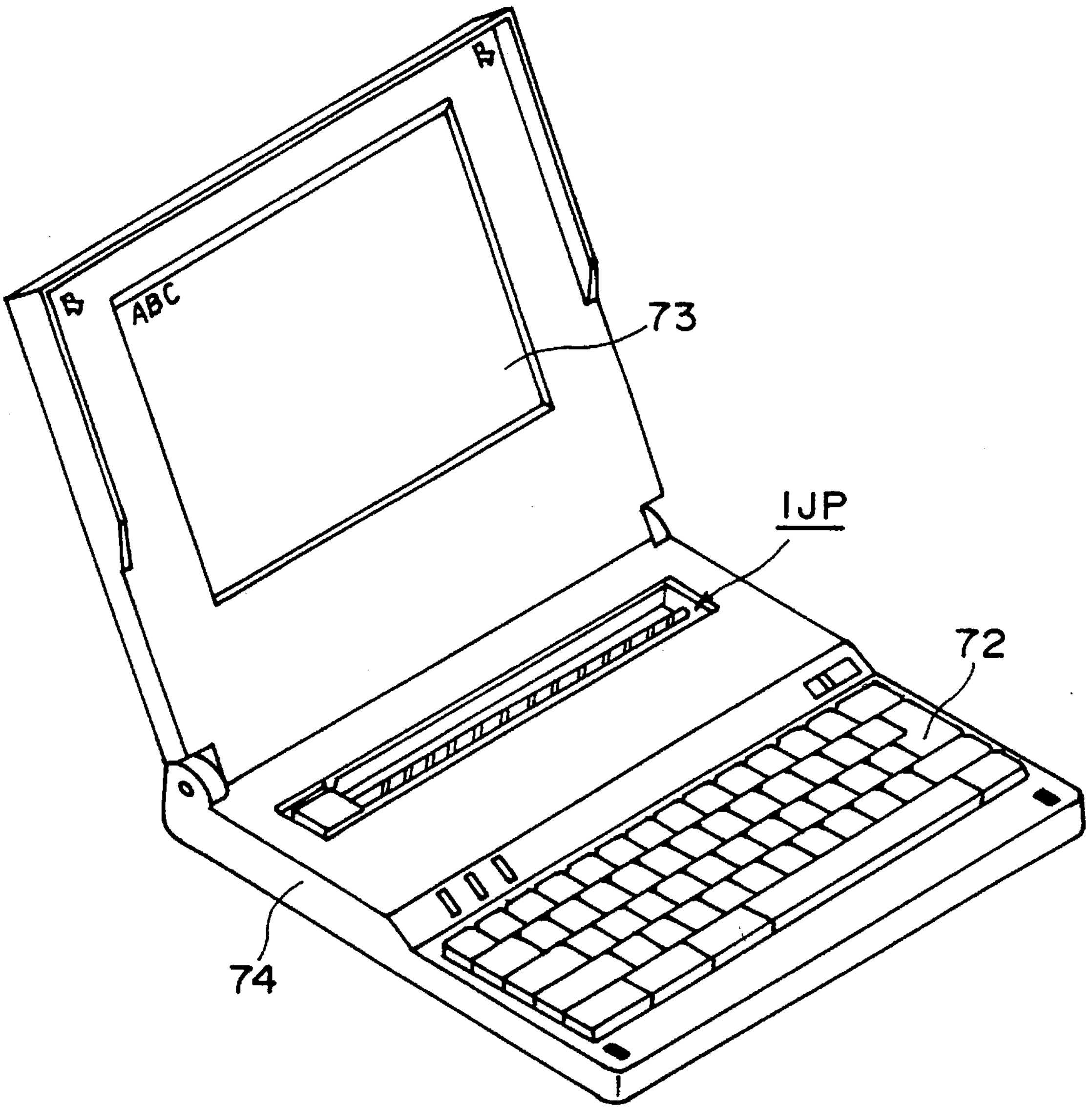
FIG. 28 is a perspective view of an example of a computer.

FIG. 28 is a perspective view of the information processing apparatus 74 having the built-in recording apparatus of this invention.

The apparatus comprises the printer IJP described in the foregoing, a key board 72 having letter, character and figure input keys and command keys, and a display 73.

Figure 29:
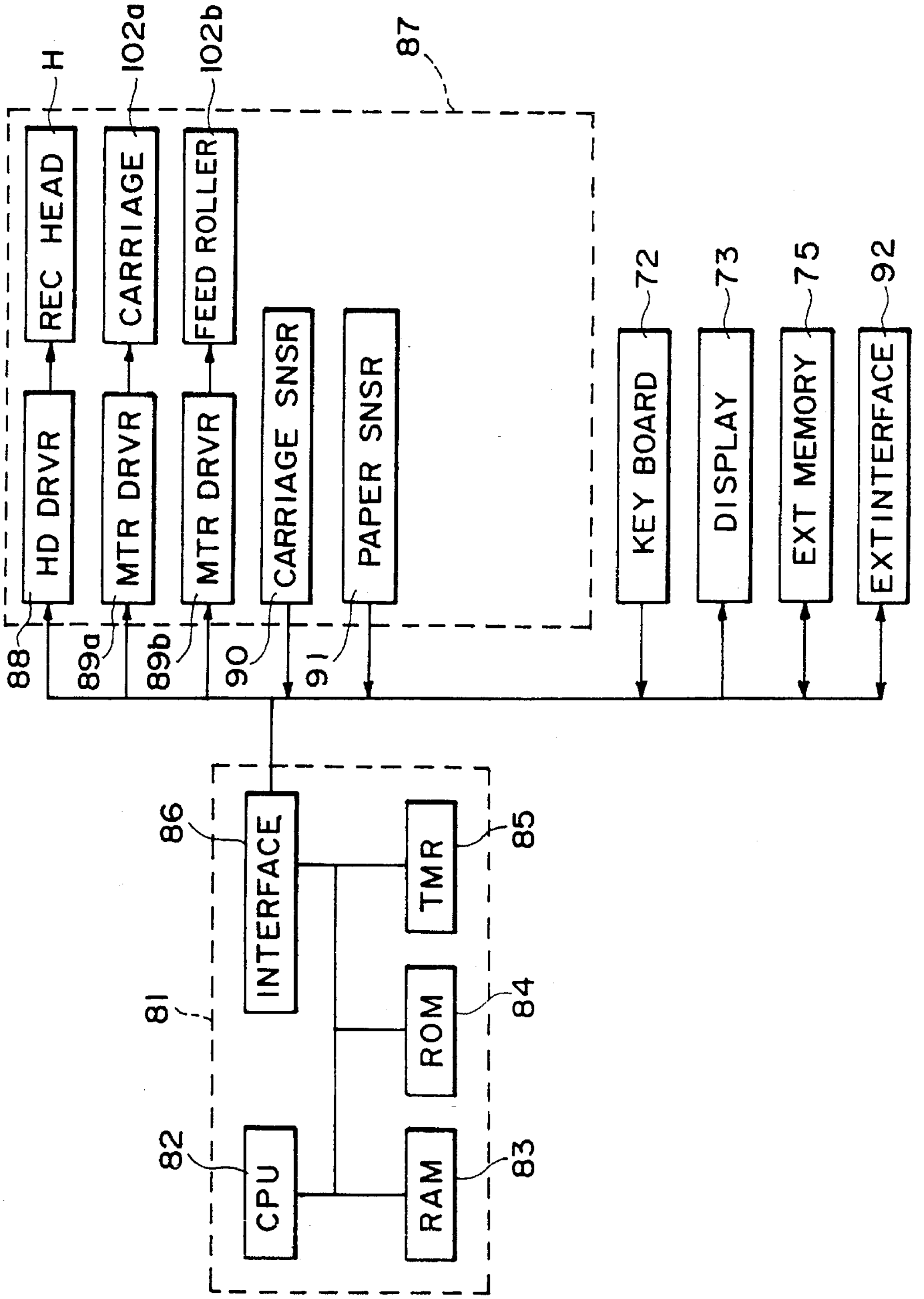
FIG. 29 is a block diagram of an electric circuit used in the computer of FIG. 28.

FIG. 29 is a block diagram of the electric circuit of the information processing apparatus 74.

The electric circuit comprises a main controller 81, a CPU includes the feature of a microcomputer 82 for sequential operation control, a RAM 83 having a working area or the area for the text data or image data, a ROM 84 for storing programs for the sequential operation and fixed data such as font data, a timer 85 for producing execution cycles for the CPU 82 and for providing proper timing for the recording operation of the printer IJP, and an interface 86 for connection of the CPU 82 with peripheral devices.

It further comprises a controller for the printer IJP, a head driver 88 for supplying electric power and recording signals to the head cartridge C, motor drivers 89*a* and 89*b* for supplying signals and electric power for driving the carriage motor 102*a* and feed roller 102*b*, a carriage sensor 90 for detecting the position of the carriage C to determine, for example, whether the carriage is at the home position or not, and a paper sensor 91 for detecting the presence of an absence of the recording material P to prevent a recording operation outside the recording material, when, for example, the recording material is not fed or when the trailing end portion of the recording material has been recorded.

It further comprises an external memory 75 such as FDD, HDD or RAM card, and an external interface 92 for communication with another information processing apparatus or for connection with the internal bus to control the peripheral device.

Although not shown in FIG. 29, there is a voltage source for supplying electric power to the electric circuit, which may be in the form of a chargeable battery, dry battery or converter for conversion from AC power.

Figure 30:
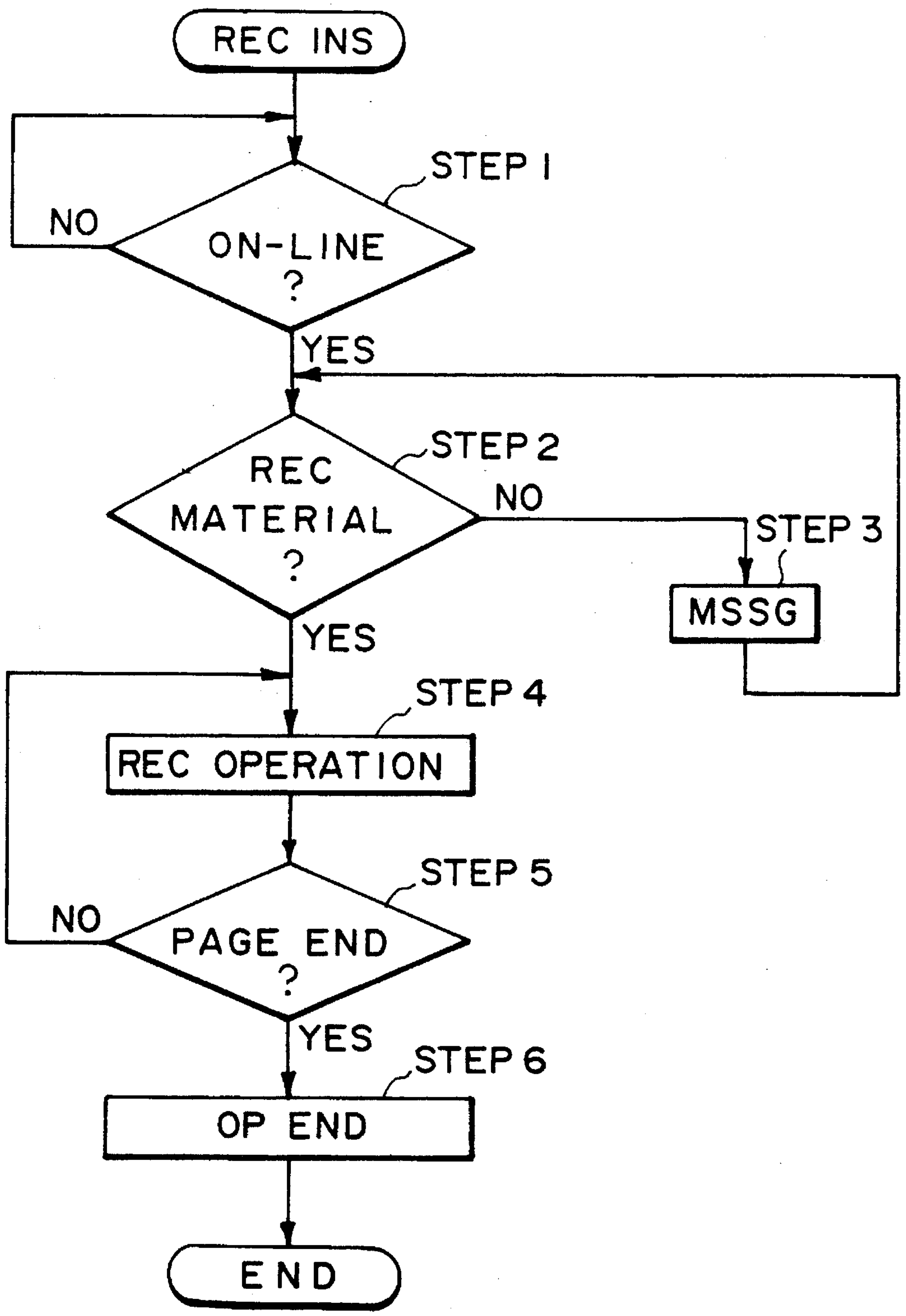
FIG. 30 is a flow chart of sequential operations for the recording.

Referring to FIG. 30, the sequential recording operation control will be described.

The following series of operations starts in response to record starting instructions from the key board or from the external record starting instructions through the interface.

First, the description will be made as to whether or not the display and the operation panel are in the on-line state, at step S1. This is done so as to avoid the start of the printing operation without sufficient preparation of the printer mainly when the record starting signal is transmitted from the outside by a communication line or the like.

At step S2, the description will be made as to whether or not the recording material P is set in the printer on the basis of output of the paper sensor 81 or the like. This is done for the purpose of avoiding the scattering of the ink, contamination of the apparatus thereby and the wasteful consumption of the ink if the printing operation is started without the recording material.

At the step S2, the discrimination may be made as to whether the nip between the pinch roller and the feed roller is released or not, because if it is released, the recording material is not properly fed. For this discrimination, the release lever may be provided with a mechanical switch. If the recording material is not properly set, the operation proceeds to step S3.

At step S3, a message is given to the operator to promote setting of the recording material. The message may be in the form of light or sound.

If the proper setting of the recording material P is discriminated at step S3, the operation proceeds to step 4, where the recording operation starts. In response to the instructions from the CPU 82, the head driver 88 drives the head cartridge C, and in synchronism therewith, the motor drivers *89a* and *89b* drive the carriage motor *102a* and the feed roller *102b*. The recording operation is carried out with main scan direction movement of the carriage C, subscan direction movement of the recording material and cleaning operation for the recording head.

At step S5, the termination of the recording operation is instructed from the CPU 82 or the like. Or when the page end or recordable range and comes, recording operation is completed.

In an ending step S6, the carriage C is returned to the home position, so that the recording head is capped to protect the ink ejection surface thereof in consideration of the possibility that the main switch is deactivated after the end of the recording. The recording material is discharged by driving the feed roller *102b* through a predetermined amount or by driving the feed roller *102b* until the sheet discharge is detected by the paper sensor 510. Then, the end of the recording operation is displayed on the display, or the signal indicative of the end is sent to the peripheral device.

In this embodiment, the recording head and the ink container are separable. They may be connected with each other on or off the carriage. Since the ink container is on the carriage, no tube for the ink supply is required, and the size of the apparatus can be reduced. When the ink becomes empty, only the ink container is changed, so that the running cost is reduced.

If one of the recording head or the ink container has to be exchanged, only that one is changed, so the apparatus is economical.

Where the recording head and the ink container are separated by the lever or the like on the carriage, the separating speed can be controlled, so that ink scattering from the ink supply port or the ink receptor port can be prevented.

When the recording head and the ink container are separated on the carriage, it is not necessary to directly touch the recording head, and therefore, the ink ejection side surface of the recording head is not touched by the operator's finger, so the ejection side surface can be protected from contamination influential to the recording operation.

When the recording head and the ink container are separated on the carriage, the portion of the ink container which receives the force is limitedly determined, the mechanical strength may be made high only at such a portion. The other portion may have a smaller thickness so that the weight can be reduced, or the inside volume (capacity) can be increased. When the recording color is to be changed, the recording head and the ink container can be replaced as a unit, and therefore, the exchange operation is easy without the possibility of the color mixture.

While the invention has been described with reference to the structures disclosed herein, it is not confined to the details set forth and this application is intended to cover such modifications or changes as may come within the purposes of the improvements or the scope of the following claims.

What is claimed is:

1. An ink container for containing ink to be supplied to an ink jet recording head for ejecting ink in accordance with recording signals, said ink container comprising:

an outer casing having a polygonal cross-section; and a flexible bag, disposed in said outer casing, having the same polygonal cross-section as said casing when said bag is filled with ink, said flexible bag having an opening at a first end thereof and a bottom portion opposed to said opening, said bag being deformable to reduce a volume thereof with consumption of the ink therefrom, wherein said bag is formed from a sheet material and includes seams in opposite sides of said bag, said seams including a first seam extending in a first direction from said opening to said bottom portion and a second seam extending in a second direction that crosses the first direction, and said bag has continuous folds in other opposite sides thereof and in a bottom side thereof, said folds being adapted to fold inwardly of said bag with resistance provided by said seams.

2. A container according to claim 1, wherein said flexible bag has an elasticity that resists collapse such that ink supply from said bag stops when an internal pressure in said bag reaches −180 mmAq.

3. A container according to claim 1, wherein said bag has a folding score in another side for permitting said bag to collapse along the score with consumption of the ink therein.

4. A container according to claim 1, wherein said flexible bag comprises a film of laminated structure which is overlaid and fused at said seams.

5. An ink container comprising:

an outer casing having a polygonal cross-section;

a flexible bag, disposed in said outer casing, having the same polygonal cross-section as said casing when said bag is filled with ink, said flexible bag having an opening at a first end thereof and a bottom portion opposed to said opening, wherein said bag is formed from a sheet material and includes seams on a side of said bag, said seams including a first seam extending in a first direction from said opening to said bottom portion and a second seam extending in a second direction that crosses the first direction; and a plug having the same polygonal cross-section as said outer casing for plugging the opening of said bag, said plug having a flange to which said outer casing is mounted and an ink outlet, wherein said plug has sealing means extending along its outer periphery for forming a sealing connection with said bag, and an outer peripheral length of said plug is smaller than a peripheral length of said bag adjacent the opening such that a surplus portion of said bag is gathered at a corner of the polygonal shape and sealed.

6. A container according to claim 5, wherein said sealing means is a groove.

7. A container according to claim 5, wherein said sealing means is a rib.

8. An ink container for containing ink to be supplied to an ink jet recording head for ejecting ink in accordance with recording signals, said ink container comprising:

an outer casing having a polygonal cross-section;

a flexible bag, disposed in said outer casing, having the same polygonal cross-section as said casing when said bag is filled with ink, said flexible bag having an opening at a first end thereof; and means for limiting deformation of said flexible bag upon consumption of the ink, said limiting means comprising seams in opposite sides of said bag for forming said flexible bag from a sheet material, wherein said bag has continuous folds in other opposite sides thereof and in a bottom side thereof, said folds being adapted to fold inwardly of said bag with resistance provided by said seams.

9. An ink container for containing ink to be supplied to an ink jet recording head for ejecting ink in accordance with recording signals, said ink container comprising:

an outer casing having a polygonal cross-section; and a flexible bag, disposed in said outer casing, having the same polygonal cross-section as said casing when said bag is filled with ink, said flexible bag having an opening at a first end thereof and a bottom portion opposed to said opening, said bag being deformable to reduce a volume thereof with consumption of the ink therefrom, wherein said bag has folds including a combination of a convex fold and a concave fold, by which the bag collapses into a predetermined shape with consumption of the ink from said ink container.

* * * * *

UNITED STATES PATENT AND TRADEMARK OFFICE
CERTIFICATE OF CORRECTION

PATENT NO. : 5,611,461

DATED : March 18, 1997

INVENTOR(S) : HIDEMI KUBOTA ET AL.

It is certified that error appears in the above-identified patent and that said Letters Patent is hereby corrected as shown below:

TITLE PAGE:
AT [56] REFERENCES CITED

Foreign Patent Documents
insert --61-93246 6/1986 Japan--.
"1133749 5/1989 Japan" should read
--1-133749 5/1989 Japan-- and
"40524143 10/1993 Japan" should read
--5-254143 10/1993 Japan--.

COLUMN 4

Line 19, "a" should be deleted.
Line 34, "FIG. 6" should read --FIGS. 6--.

COLUMN 6

Line 11, "a" should be deleted.
Line 13, "this Figure," should read --these Figures,--.
Line 26, "figure," should read --figures,-- and
"heaters 101"" should read --heaters 101--.

COLUMN 7

Line 14, "sufficient" should read --sufficiently--.

COLUMN 8

Line 13, "member 57." should read --member 59.--.
Line 23, "screw 44" should read --screw 46--.
Line 42, "key board 72" should read --keyboard 72--.
Line 63, "of an" should read --or--.

UNITED STATES PATENT AND TRADEMARK OFFICE

CERTIFICATE OF CORRECTION

PATENT NO. : 5,611,461

DATED : March 18, 1997

INVENTOR(S) : HIDEMI KUBOTA ET AL.

It is certified that error appears in the above-identified patent and that said Letters Patent is hereby corrected as shown below:

COLUMN 9

Line 13, "key board" should read --keyboard--.
Line 51, "and" should read --end--.

Signed and Sealed this

Thirtieth Day of September, 1997

Attest:

BRUCE LEHMAN

*Attesting Officer*

*Commissioner of Patents and Trademarks*